(12) United States Patent
Kosuri

(10) Patent No.: US 9,255,395 B2
(45) Date of Patent: Feb. 9, 2016

(54) FLANGE OF A WIND TURBINE

(71) Applicant: Siemens Aktiengesellschaft, Munich (DE)

(72) Inventor: Srinivas Ratna Kosuri, Brande (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/622,833

(22) Filed: Feb. 14, 2015

(65) Prior Publication Data
US 2015/0308097 A1    Oct. 29, 2015

(30) Foreign Application Priority Data
Apr. 25, 2014 (EP) .................................. 14166020

(51) Int. Cl.
| E04B 1/38 | (2006.01) |
| E04H 12/22 | (2006.01) |
| E04B 1/41 | (2006.01) |
| F03D 11/04 | (2006.01) |

(52) U.S. Cl.
CPC .. *E04B 1/40* (2013.01); *F03D 11/04* (2013.01)

(58) Field of Classification Search
CPC ............... F05B 2230/604; F05B 2240/912; F05B 2260/301; E04H 12/085; F03D 11/04; E04B 1/585
See application file for complete search history.

(56) References Cited

U.S. PATENT DOCUMENTS

| 8,322,757 | B2 | 12/2012 | Ma | |
| 2004/0112002 | A1* | 6/2004 | Wobben | E04H 12/085 52/831 |
| 2009/0285693 | A1* | 11/2009 | Bech | F03D 1/003 416/248 |
| 2010/0058673 | A1* | 3/2010 | Numajiri | E04H 12/085 52/40 |
| 2010/0101173 | A1* | 4/2010 | Bagepalli | E04H 12/085 52/651.01 |
| 2010/0307097 | A1* | 12/2010 | Word, III | E04H 12/085 52/651.07 |
| 2011/0047899 | A1* | 3/2011 | Numajiri | B23K 31/02 52/173.1 |
| 2011/0135492 | A1* | 6/2011 | Tetambe | F03D 11/00 416/244 R |
| 2012/0001438 | A1* | 1/2012 | Matsuo | F03D 11/00 290/55 |
| 2012/0061024 | A1* | 3/2012 | Starke | B29C 33/306 156/475 |
| 2014/0215930 | A1* | 8/2014 | Zavitz | F03D 11/04 52/40 |

FOREIGN PATENT DOCUMENTS

| DE | 202013010214 U1 * | 11/2014 | ............ E04H 12/085 |
| EP | 1314854 A1 * | 5/2003 | ............. F01D 5/026 |
| EP | 1616066 A1 | 1/2006 | |
| ES | WO 0142647 A2 * | 6/2001 | ............ F03D 1/0658 |

* cited by examiner

*Primary Examiner* — Christine T Cajilig
(74) *Attorney, Agent, or Firm* — Beusse Wolter Sanks & Maire

(57) ABSTRACT

An improved flange in a wind turbine is provided. The flange has a flange plate that is connected to a part of the wind turbine. The flange plate and the part of the wind turbine are connected via an edge to form an L-shaped flange. The flange plate includes a connection side to be detachable connected to a counterpart. The flange plate includes a plurality of holes to be used with a connector when the flange is connected to the counterpart. A recess is arranged in the surface of the connection side between the edge of the flange plate and the plurality of holes, to reduce fatigue loads in the area of the holes of the flange plate.

11 Claims, 3 Drawing Sheets

FLANGE OF A WIND TURBINE

CROSS REFERENCE TO RELATED APPLICATIONS

This application claims the benefit of European Application No. EP14166020 filed Apr. 25, 2014, incorporated by reference herein in its entirety.

FIELD OF INVENTION

The invention relates to an improved flange in a wind turbine.

BACKGROUND OF INVENTION

A wind turbine comprises a rotor, a nacelle and a tower. The rotor comprises rotor blades and a rotor hub.

The wind interacts with the rotor blades and rotates the rotor of the wind turbine. The rotor is connected to an electric generator. The rotation is transferred to the electric generator and the rotational energy is transferred into electric energy in the electric generator.

The rotor is connected to the electric generator. The electric generator is connected to a support structure in the nacelle. The nacelle is connected to the tower of the wind turbine. Flanges are used to establish connections between different parts of the wind turbine, for example between the rotor of the electric generator and the hub, or between the stationary part of the electric generator and a support structure of a direct driven wind turbine.

Due to the weight of the components of a wind turbine, and due to the loads induced into the wind turbine by the wind, static loads and varying loads need to be transferred over the flange connections in the wind turbine.

These loads lead to forces acting on the flange connection and the flanges. The flanges comprise holes that are used with connectors, like bolts or rivets, when the flanges are connected.

The forces acting on the flange connection lead to stress in the area of the holes and the connectors. The stress at the holes and connectors leads to fatigue, to a reduction of the durability, and thus to a reduction of the lifetime of the flange connection.

A reduction in lifetime is unwanted and thus the stress at the holes and the connectors of the flanges in the wind turbine needs to be reduced.

SUMMARY OF INVENTION

An aim of the invention is therefore to provide an improved flange connection.

An object of the invention is achieved by the independent claim. Further features of the invention are disclosed in the dependant claims.

A flange of a wind turbine is disclosed, whereby the flange comprises a flange plate that is connected to a part of the wind turbine. The flange plate and the part of the wind turbine are connected via an edge to form an L-shaped flange. The flange plate comprises a connection side to be detachable connected to a counterpart. The flange plate comprises a plurality of holes to be used with connectors when the flange is connected to the counterpart.

A recess is arranged in the surface of the connection side between the edge of the flange plate and the plurality of holes, to reduce fatigue loads in the area of the holes of the flange plate.

A flange of a wind turbine is a part of the connection between the generator and the stationary support structure of a direct driven wind turbine, for example. The flange can also be a part of the connection between the rotor hub of the wind turbine and the generator.

The flange comprises a flange plate. The flange plate comprises a side that is connected to a counterpart to form a flange connection.

The flange plate is connected to a part of the wind turbine over an edge. The connection at the edge shows an L-shaped form in a longitudinal cut through the flange connection. The longitudinal cut is performed vertical to the side used to form the flange connection.

The flange plate comprises a plurality of holes. The holes are used to connect the flange to a counterpart by bolts. The connection between the flange and the counterpart is a fixed but detachable connection. The connected flange and the counterpart form the flange connection.

The holes are located in the surface of the flange plate with a certain distance to the edge at the connection to the part of the wind turbine.

During the operation of the wind turbine loads are transferred over the flange connection. These lead to forces acting on the flange connection that pull at the flange connection and thus tend to open the flange connection. Thus a gap is forming between the flange plate and the counterpart.

These forces are acting on the bolts of the flange connection. Thus the loads within the flange plate are highest in the area of the holes for the bolts. Loads in the flange plate lead to fatigue in the material. This reduces the lifetime of the flange connection.

A recess is introduced in the surface of the connection side of the flange plate. The recess is located between the edge where the flange plate is connected to the part of the wind turbine and the holes in the flange plate.

The recess changes the distribution of the forces acting on the bolts in the flange connection. The forces acting on the bolts in the area of the recess are reduced. Thus also the loads in the area of the bolt holes are reduced.

Thus the fatigue in the flange plate is reduced. Thus the lifetime of the flange connection is increased.

Due to the recess, the thickness of the material of the flange plate is reduced. Thus high loads in the flange plate are transformed into a flexible deformation of the flange plate. Thus the flange connection is allowed to open in the areas of the recess. Thus peaks in loads, especially in rapidly changing load situations, are alleviated. Thus the peak loads in the area of the holes in the flange plate are reduced.

The recess leads along the surface of the connection side of the flange plate between the edge and the holes.

Loads and forces are induced into the flange over the edge of the flange.

The length between the edge of the flange and the holes of the flange acts like a lever.

The maximum of the loads occurs in the area of the bolt holes, when the flange connection is established through bolts.

The recess leads along the surface of the connection side. The recess comprises a longish shape and is oriented in a way to lead along the surface between the edge and the holes.

Thus the recess can also extend along the surface between the edge and more than one of the holes.

Thus the stress in several holes is reduced by one recess.

The recess can be planned to have a length to optimize the level of stress in several bolt holes of the flange plate.

Thus the load, and thus the fatigue, in the holes can be equalized.

Thus the lifetime of the flange plate is optimized.

The cross-section of the recess is mainly half circular-shaped.

Thus the recess comprises a smooth surface, and there are no sharp edges present in the recess that lead along the length of the recess.

Sharp edges, especially inner edges, lead to a concentration of loads in the area of the edge. The material of the flange would suffer from fatigue primarily in the area of a sharp inner edge.

By avoiding a sharp edge, the concentration of loads and thus the weakening of the structure due to fatigue at a certain spot are reduced.

The recess is arranged in a zig-zag pattern in the surface of the connection side.

The recess leads in a zig-zag shaped pattern along the surface of the flange. Thus maxima of forces that might occur at the edge of the recess are distributed over area with a different distance to the edge of the flange.

Thus the risk of damaged occurring due to maxima of forces at the recess of the flange is distributed over a larger are of the surface. Thus the risk of fatigue of the flange is locally reduced.

The recess is arranged in a wave-pattern in the surface of the connection side.

A wave pattern shows no sharp edges in its shape. Thus the distribution of forces is more even. Thus maxima of loads and forces at edges are avoided.

The zig-zag pattern or the wave-pattern of the recess is arranged in a way that the parts of the recess arranged between a hole and the edge of the flange are located closer to the edge of the flange, than the parts of the recess arranged between two adjacent holes and the edge of the flange, so that the recess shows a mainly constant distance to the holes.

The recess in the surface of the connection side of the flange is located with a certain distance to the holes in the flange, that are used by bolts to connect the flange connection.

The recess is arranged along the surface as a zig-zag pattern or as a wave-pattern. The pattern is arranged in relation to the holes of the flange in a way that the recess is located with a mainly constant distance to the holes.

Maxima of loads and thus of fatigue might occur at a spot of minimum distance between the recess and a hole in the flange.

Thus maxima of loads at single bolt holes are avoided.

The flange is a circular flange, whereby the surface of the connection side is ring-shaped, and the recess leads along a certain predetermined part of the ring shaped surface.

Flanges that connect rotatable parts are often circular shaped flanges. High fatigue loads in the area of the bolt holes occur along a certain area of the flange. This area can be a certain sector along the circular flange.

To reduce the loads and fatigue in this sector, the recess leads along the sector, so along a certain predetermined part of the ring shaped surface of the flange.

The recess comprises a first end and a second end, and that the ends of the recess point towards the edge of the flange and away from the holes.

The end of the recess is the area where the influence of the recess on the distribution of the forces in the flange ends.

Maxima of loads might occur at the ends of the recess. The maxima are reduced, when the ends of the recess are in an area of the recess that points away from a hole.

Thus the risk of additional maxima of loads and thus a higher fatigue at the bolt hole close to the end of the recess is reduced.

The recess is arranged in an area of the connection side where a maximum of force is induced into the flange during the operation of the wind turbine.

Thus the maximum of the forces leading to fatigue in the area of the bolt holes are reduced.

Thus the maximum of the fatigue in the area of the bolt holes is reduced.

The connection side of the flange is arranged mainly vertical during the operation of the wind turbine and that at least one recess is arranged in the upper area of the connection side of the flange.

The rotational axis of the flange connection is arranged mainly horizontal, thus the plane of the flange connection is arranged mainly vertical.

The forces transferred over the flange connection during the operation of the wind turbine are axial forces, radial forces, and tilting moments.

Thus the forces acting on the flange that tend to open the flange connection are highest in the upper area of the flange connection.

The recess is arranged in the upper area of the connection, thus the forces present in the upper area of the flange connection are reduced.

Thus the forces that tend to open the flange connection, and thus are extremely relevant for the fatigue in the area of the bolt holes, are reduced.

A use of a flange in a direct driven wind turbine is disclosed.

In a direct driven wind turbine the rotation of the rotor hub with the rotor blades is directly transferred to the rotor of the electrical generator without the use of an gear.

Thus the rotor of the wind turbine is attached to the rotor of the electric generator. Connections between rotatable parts are established by flanges.

Also the stationary part of the generator is attached to the support structure of the wind turbine. This connection is also established by a flange.

The flanges experience the loads transferred from the rotor to the generator, or the loads transferred from the stationary part of the generator to the support structure of the wind turbine.

The flange according to this description experiences less fatigue in the area of the bolt holes. Thus the life-time of the flange is increased. Thus the costs for service and replacement of parts are reduced.

The flange is a flange of the support structure of the nacelle of the wind turbine, and the flange is used to connect the electric generator to the support structure.

Thus fatigue loads in the flange of an electric generator of a wind turbine or in a support structure of the wind turbine are reduced. Thus the live-time and reliability of the parts of the wind turbine is enhanced.

BRIEF DESCRIPTION OF THE DRAWINGS

The invention is shown in more detail by the help of figures. The figures show a representative configuration and do not limit the scope of the invention.

DETAILED DESCRIPTION OF INVENTION

Figure 1:
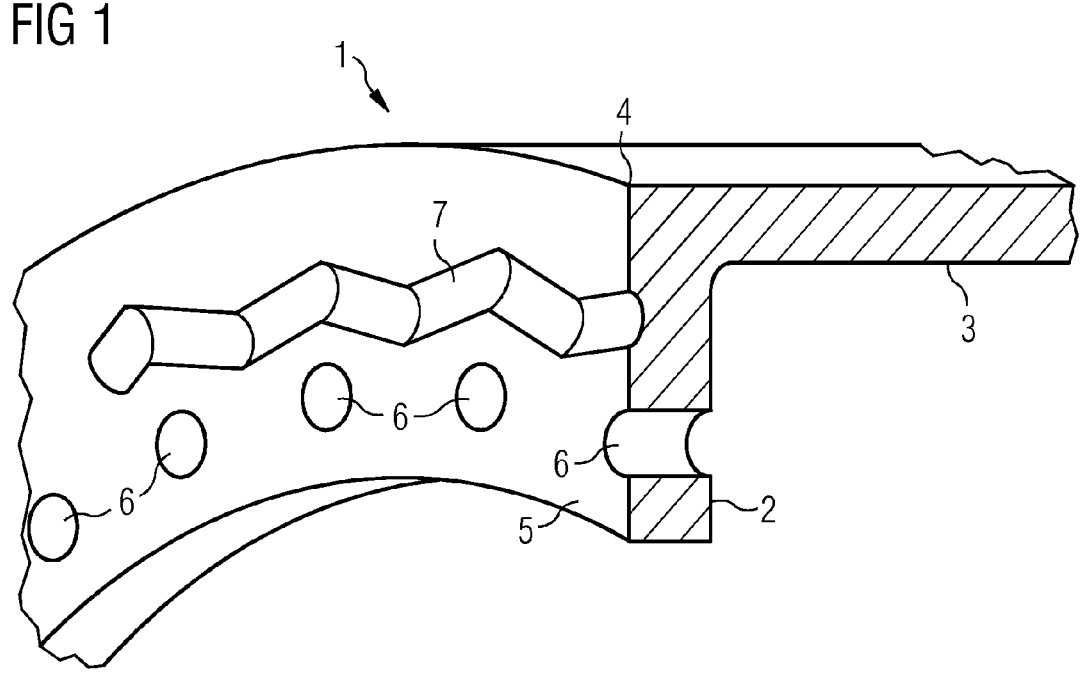
FIG. 1 shows a flange of a wind turbine.

FIG. 1 shows a flange 1 of a wind turbine. The flange 1 comprises a flange plate 2 that is connected to a part of the wind turbine 3 over an edge 4.

The flange plate 2 and the part of the wind turbine 3 form an L-formed flange 1. The flange plate 2 shows a connection side 5. When the flange 1 is connected to a counterpart, the connection side 5 is in contact to the counterpart.

The flange plate 2 comprises a plurality of holes 6 to be used with connectors. The connectors are used to connect the flange 1 to a counterpart.

During the operation of the wind turbine forces are transferred from the counterpart to the flange 1. These forces can be axial forces, radial forces, tilting moments and also the weight of the rotor and the generator of the wind turbine.

The forces that are transferred from the counterpart into the flange 1 lead to high loads in the area of the holes 6.

A recess 7 is present in the surface of the connection side 5. The recess 7 shows a zig-zag-shaped pattern.

As it can be seen in the cut through the flange 1, the shape of the cross-cut through the recess 7 is mainly half-circular shaped.

The recess 7 is arranged along the surface of the connection side 5 in the area between the holes 6 and the edge 4.

Figure 2:
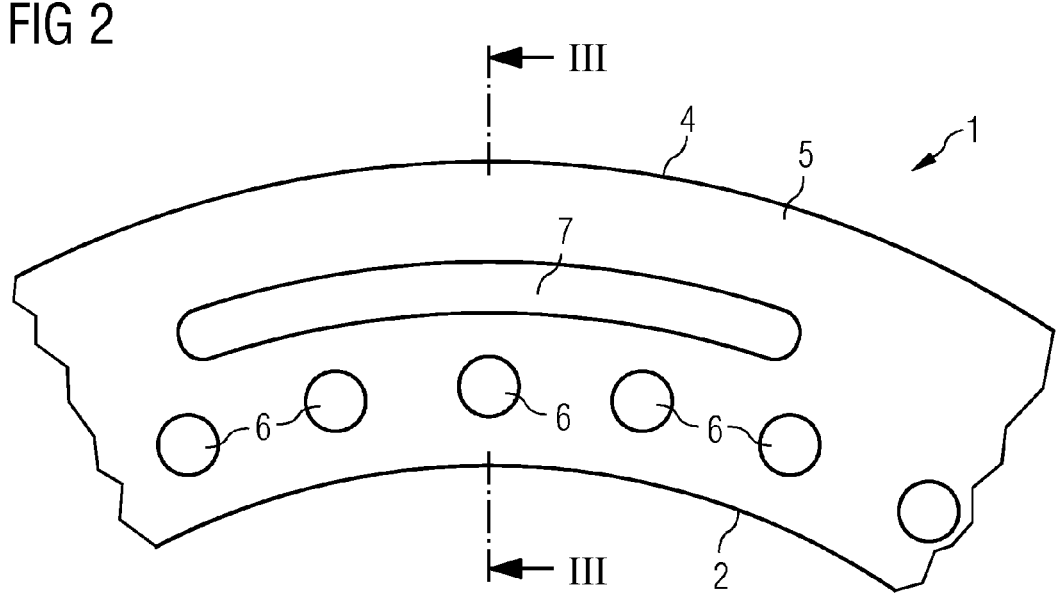
FIG. 2 shows a first embodiment of the flange.

FIG. 2 shows the first embodiment of the flange 1. The flange 1 comprises a flange plate 2. The flange plate 2 comprises a connection side 5. The connection side 5 is later connected to a counterpart of the flange 1.

The flange plate 2 is connected to a part of the wind turbine over an edge 4. The flange plate 2 shows a plurality of holes 6 to be used with connectors and to connect the flange 1 to a counterpart.

The connection side 5 of the flange plate 2 comprises a recess 7. The recess 7 leads along the surface of the connection side 5 in the area between the hole 6 and the edge 4.

Figure 3:
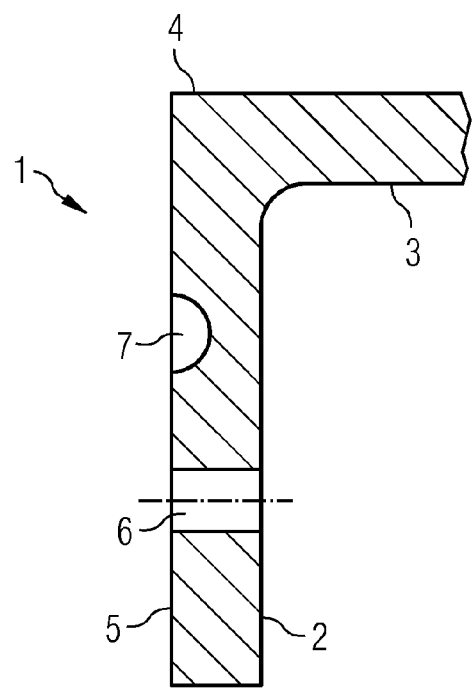
FIG. 3 shows a cut through the flange.

FIG. 3 shows a cut III-III through the flange 1. The flange 1 comprises a flange plate 2 that is connected to a part 3 of the wind turbine over an edge 4. The part 3 of the wind turbine and the flange plate 2 form an L-shaped flange 1.

The flange plate 2 comprises a plurality of holes 6 to connect the flange 1 to a counterpart with connectors. The flange plate 2 comprises a connection side 5 that is in contact to the counterpart of the flange 1 when the flange 1 is connected to a counterpart.

In the surface of the connection side 5, in the area between the hole 6 and the edge 4, a recess 7 can be seen. The recess shows a half circular-shaped form in the cross-cut seen in FIG. 3.

Figure 4:
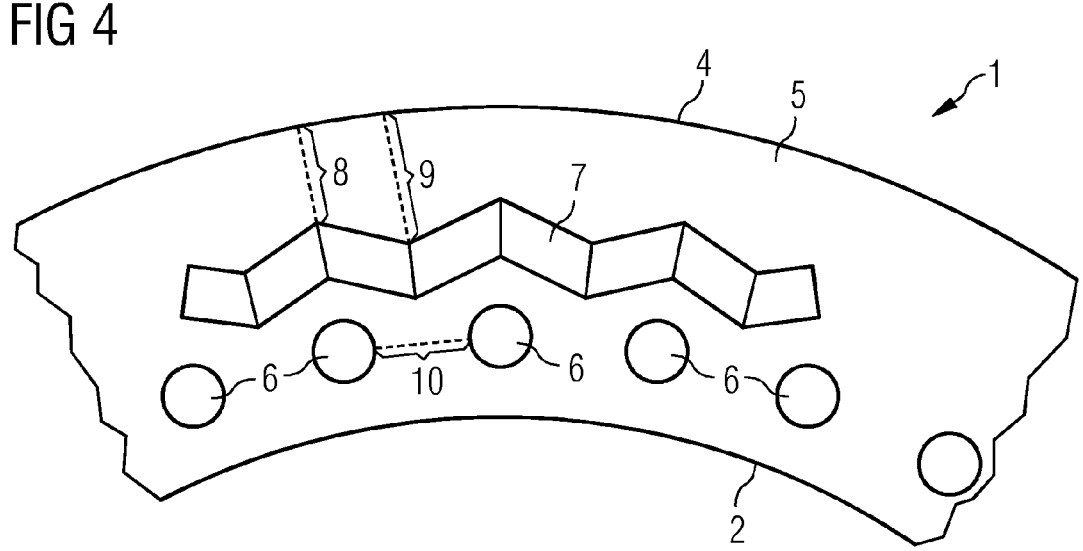
FIG. 4 shows a second embodiment of the flange.

FIG. 4 shows a second embodiment of the flange 1. The flange 1 comprises a flange plate 2. A plurality of holes 6 is present in the flange plate 2. The flange plate 2 comprises a connection side 5 to be connected to a counter part of the flange 1.

The flange plate 2 is connected to a part of the wind turbine over an edge 4.

A recess 7 can be seen in the surface of the connection side 5. The recess 7 shows a zig-zag-shaped pattern and leads along the surface of the connection side 5.

The recess 7 is arranged in the area between the holes 6 of the flange plate 2 and the edge 4. The distance 8 between the recess 7 and the edge 4 is smaller in the area between a hole 6 and the edge 4 than it is in the area between two holes 6 and the edge 4.

There, the distance 9 between the recess 7 and the edge 4 is bigger than the distance 8. The distance between two holes is the distance 10.

Thus, the recess 7 is arranged in the surface of the connection side 5 in a way that the distance between the holes 6 and the recess 7 is mainly constant.

Figure 5:
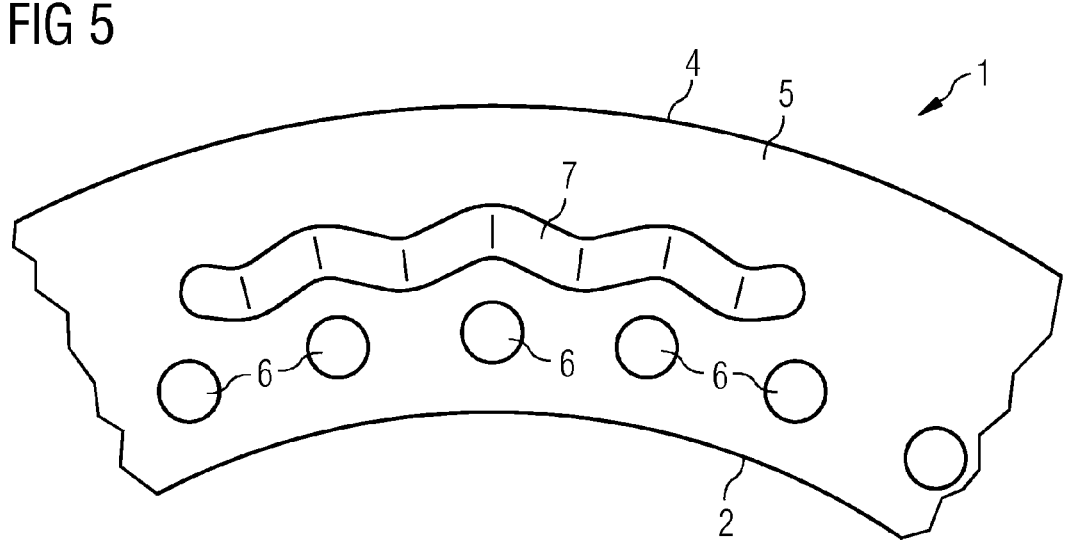
FIG. 5 shows a third embodiment of the flange.

FIG. 5 shows a third embodiment of the flange 1. The flange 1 comprises a flange plate 2 that is connected over an edge 4 to a part of the wind turbine.

The flange plate 2 comprises a plurality of holes to be used with connectors to connect the flange 1 to a counterpart. The flange plate 2 shows a connection side 5. A recess 7 is arranged in the surface of the connection side 5 in the area between the plurality of holes 6 and the edge 4.

In this embodiment, the recess 7 shows the form of a wave. The wave-shaped recess 7 leads along the surface of the connection side 5 of the flange plate 2 in a way that the distance between the holes 6 and the recess 7 is mainly constant.

Figure 6:
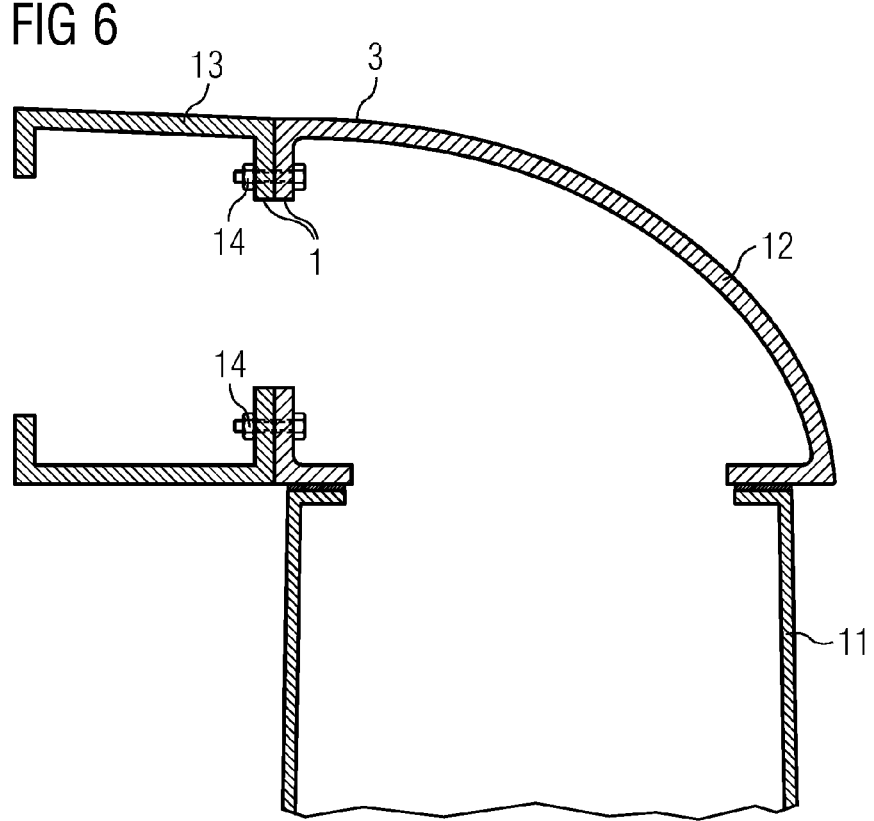
FIG. 6 shows a cut through a wind turbine.

FIG. 6 shows a cut through a wind turbine, the wind turbine comprises a tower 11 and a support structure 12. An electric generator 13 is connected to the support structure 12. A flange 1 is used to connect the electric generator 13 to the support structure 12.

The support structure 12 is a part 3 of a wind turbine. The flange 1 is connected to the counter part by the use of connectors 14.

Forces are transferred from the generator 13 to the support structure 12 and to the tower 11. These forces can be axial forces, radial forces or tilting moments.

In addition, the support structure 12 supports the weight of the generator 13 and of the rotor of the wind turbine. The forces are transferred over the flange connection comprising the flange 1.

The illustration in the drawings is in schematic form. It is noted that in different figures, similar or identical elements are provided with the same reference signs.

Although the present invention has been described in detail with reference to the disclosed embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A flange of a wind turbine comprising
   a flange plate that is connected to a part of the wind turbine,
   wherein the flange plate and the part of the wind turbine are connected via an edge to form an L-shaped flange,
   wherein the flange plate comprises a connection side to be detachable connected to a counterpart,
   wherein the flange plate comprises a plurality of holes to be used with connectors when the flange is connected to the counterpart,
   wherein a recess extends in a wave-pattern along the surface of the connection side between the edge of the flange plate and the plurality of holes, to reduce fatigue loads in the area of the holes of the flange plate.

2. The flange according to claim 1, wherein a cross-section of the recess is mainly half circular-shaped.

3. A flange of a wind turbine comprising
   a flange plate that is connected to a part of the wind turbine,
   wherein the flange plate and the part of the wind turbine are connected via an edge to form an L-shaped flange,
   wherein the flange plate comprises a connection side to be detachable connected to a counterpart, wherein the flange plate comprises a plurality of holes to be used with connectors when the flange is connected to the counterpart, wherein a recess extends in a zig-zag pattern along the surface of the connection side between the edge of the flange plate and the plurality of holes, to reduce fatigue loads in the area of the holes of the flange plate.

4. The flange according to claim 3, wherein the zig-zag pattern is arranged such that the parts of the recess arranged between a hole and the edge of the flange are located closer to the edge of the flange, than the parts of the recess arranged between two adjacent holes and the edge of the flange, so that the recess shows a mainly constant distance to the holes.

5. The flange according to claim 1, wherein the flange is a circular flange, whereby the surface of the connection side is ring-shaped, and the recess leads along a certain predetermined part of the ring shaped surface.

6. The flange according claim 3, wherein the recess comprises a first end and a second end, and the ends of the recess point towards the edge of the flange and away from the holes.

7. The flange according to claim 1, wherein the recess is arranged in an area of the connection side where a maximum of force is induced into the flange during the operation of the wind turbine.

8. The flange according to claim 1, wherein the connection side of the flange is arranged mainly vertical during the operation of the wind turbine and at least one recess is arranged in the upper area of the connection side of the flange.

9. A direct driven wind turbine comprising the flange according to claim 1.

10. The direct driven wind turbine according to claim 9, whereby the flange is a flange of the support structure of the nacelle of the wind turbine, and the flange is used to connect the electric generator to the support structure.

11. The flange according to claim 1, wherein the wave-pattern of the recess is arranged such that the parts of the recess arranged between a hole and the edge of the flange are located closer to the edge of the flange, than the parts of the recess arranged between two adjacent holes and the edge of the flange, so that the recess shows a mainly constant distance to the holes.

* * * * *